Oct. 2, 1951          J. W. WHITE ET AL          2,569,790
              VALVE FOR SUCTION SOCKET PROSTHESIS
                     Filed June 30, 1950
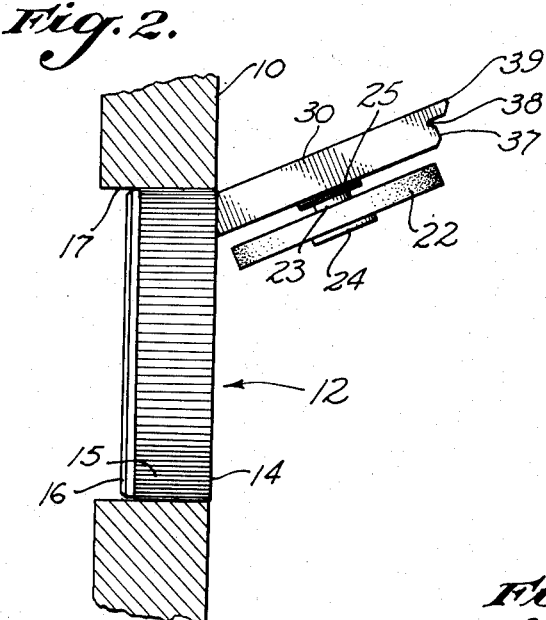
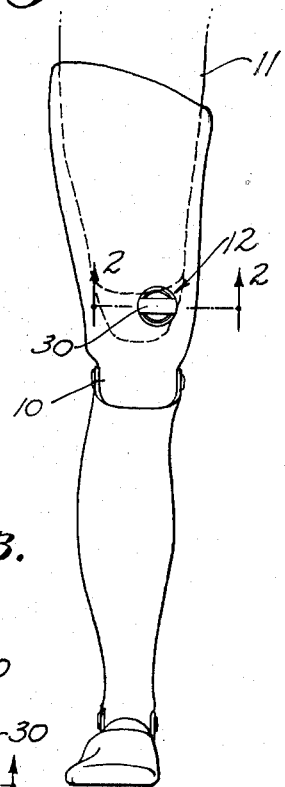
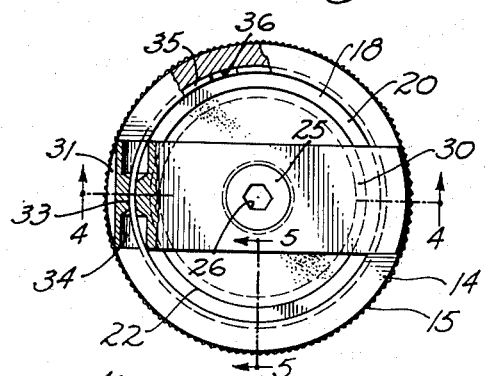
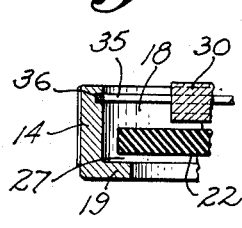
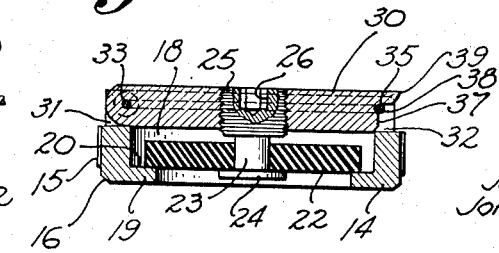
JOHN W. WHITE
JOHN J. VOLLMER
INVENTORS.
BY
Fulwider & Mattingly.
ATTORNEYS.

Patented Oct. 2, 1951

2,569,790

UNITED STATES PATENT OFFICE 2,569,790

VALVE FOR SUCTION SOCKET PROSTHESIS

John William White, Los Angeles, and John J. Vollmer, San Fernando, Calif.; said Vollmer assignor to said White Application June 30, 1950, Serial No. 171,356

8 Claims. (Cl. 3—3)

Our invention relates generally to a vacuum type prosthesis or artificial limb, and more particularly to a valve for installation in the socket thereof.

The valve disclosed as a preferred embodiment of our invention has been found especially advantageous for use in artificial legs fitted to limbs amputated above the knee, although its use is not limited to this application.

A suction type artificial leg has a socket of such dimension as to create an air space or pocket between the end portion or stump of the natural limb and the distal end of the socket. This pocket is exhausted sufficiently to create a partial vacuum which holds the leg firmly in place when the stump is raised by the wearer. However, certain difficulties are caused by the shifting of the stump within the socket during the walking cycle. When the body weight is applied to the artificial leg the stump tends to move downwardly in the socket, and as the weight is shifted to the other leg and the artificial leg is swung forwardly, the stump tends to return upwardly. The amount of relative movement between the stump and socket may be as much as ¾" and cannot be eliminated because of the compression and deformation of the stump tissue. The result is a pumping action which tends to compress the air between the stump and the distal end of the socket. Heretofore, a spring loaded relief valve has been placed in the lower end of the socket to allow a portion of this air to escape and maintain a sufficient vacuum to keep the leg in place when it is again lifted.

The use of the prior types of socket valves to keep a sustained vacuum in the socket is mechanically sufficient, but has many physical disadvantages. Numerous tests have shown that a sustained vacuum in the socket is a cause of edema or nerve irritation after several hours of use. A sustained vacuum also causes leg odors due to stale air, perspiration, excess heat, and skin infection. The constant vacuum pull is fatiguing to the wearer, making it necessary to frequently remove the leg for recuperation and rest. Furthermore, valves of the previous types have restricted exhaust openings which cause them to emit a loud, unsocial noise when operating.

It is therefore a major object of our invention to provide a valve for a vacuum prosthesis that overcomes the aforementioned disadvantages, and increases the comfort of the wearer by the application of a new principle of valve control by which a vacuum is maintained only when the leg is lifted, and at all other times the socket may be open to the atmosphere.

Another object of our invention is to provide a partial exchange of the residual socket air, thus materially reducing the foul socket odors, perspiration, excess heat, and tendency to cause infection.

It is also an object of our invention to provide a socket valve having an intermittent action which stimulates and massages the limb stump.

A further object of our invention is to provide a socket valve having a large exhaust opening and exit passageways for quiet operation.

Still another object of our invention is to provide a valve having adjustment means which adapt the valve for operation under varying personal characteristics such as weight, activity, rapidity of walk, and nature of vocation. Also, the adjustment means compensate for varying physical dimensions such as the girth and length of the stump.

An additional object of our invention is to provide a valve housing having a large internal opening, and a pivotally mounted valve carrier that can be swung outwardly to allow removal of the stocking used over the stump when attaching and inserting same into the prosthesis, with the valve carrier being an integral part of the assembly so that it is not dropped or displaced during the operation.

These and other objects and advantages of our invention will become apparent from the following detailed description of a preferred form thereof, and from an inspection of the accompanying drawings, in which:

Fig. 1 is a front elevation of a prosthesis showing our valve installed therein, with the valve carrier horizontally disposed;

Fig. 2 is a view taken substantially along the line 2—2 of Fig. 1 showing the valve carrier in an open position;

Fig. 3 is a front elevation of the complete valve assembly;

Fig. 4 is a cross section taken along the line 4—4 of Fig. 3; and

Fig. 5 is a partial section taken along the line 5—5 of Fig. 3 showing the valve disk in the open position.

Referring now to the drawings, and particularly to Fig. 1 thereof, the numeral 10 indicates generally the upper portion or socket member of a vacuum type artificial leg adapted to fit over a limb stump 11 on the body of the wearer. A valve assembly 12 embodying our invention is mounted in the wall of the socket member 10 and communicates with the interior, being preferably mounted on the front below the end of the stump 11, and slightly towards the inner side of the leg. The valve 12 thus directly controls the air pressure within the pocket or space between the distal end of the socket 10 and stump 11.

The valve assembly has a body member or housing 14 formed as an annular ring of relatively hard material. On the exterior of the housing 14 are longitudinal serrations or ridges 15 spaced entirely around the periphery. The serrations 15 may be formed on a knurling machine and are preferably terminated short of the inner end of the housing 14 which has a short chamfered pilot portion 16 to aid in entering the socket member 10. As is best seen in Fig. 2, the serrations 15 are adapted to be pressed into the wall of an opening 17 cut in the socket member 10 so as to hold the housing 14 flush with the exterior surface of the member. The socket member 10 is typically of wood or composition material, and the housing 14 may be sealed tightly in place by a suitable cement. By the use of the straight knurling or serrations 15 and chamfer 16, the housing 14 is easily engaged in the socket member 10, and may, if necessary, be removed without damage to the socket material.

The interior of the housing 14 defines a large cylindrical passageway 18 which extends through to the pocket or air space within the socket 10. At the bottom or inner end of the housing 14 is an internal flange 19 which forms an outwardly facing valve seat 20. Outwardly of the seat 20 is a valve disk 22 mounted on a central stem 23. The disk 22 overlaps the seat 20 and is adapted to close the interior of the socket 10 to the atmosphere.

The valve disk 22 is slidably mounted on the valve stem 23 and floats freely thereon so that it can easily be raised from the valve seat 20. The inner portion of the valve stem 23 has a head 24 which limits the inward movement of the disk 22, and the outer portion of the stem 23 is formed as an enlarged adjustment screw 25 which limits the outward movement of the disk. The screw 25 is located along the axis of the housing 14 and is threadedly engaged with a transverse carrier or support 30 extending across the passageway 18. On the outer face of the screw 25 is a suitable adjustment means such as a wrench socket 26 for moving the screw relative to the carrier 30 and along the axis of the housing 14.

The valve disk 22 is preferably of a lightweight, flexible material such as synthetic rubber which is highly resistant to body excretions. When the disk 22 is closed against the seat 20 it seals tightly, closing the passageway 18. When the disk 22 is raised as shown in Fig. 5 it opens the interior of the socket 10 through a relatively large annular port 27. The desired operating clearance between the seat 20 and disk 22 of the port 27 is controlled by the adjustment of the screw 25, thus varying the rapidity with which the valve disk 22 may open and close. Because of the large valve opening and the free flow path provided for the escaping air, the operation of the valve is quiet and overcomes one of the major disadvantages of prior socket valves.

The carrier or support 30 extends diametrically across the housing 14 to support the valve disk 22 and stem 23. The carrier 30 is pivotally mounted on the rim of the housing 14 and swings the valve disk 22 from a position adjacent the seat 20 outwardly to the position shown in Fig. 2. When the carrier 30 is swung outwardly the entire area of the passageway 18 is clear for a purpose as will later be explained. The carrier 30 is of elongated rectangular shape and is fitted into guide slots 31 and 32 located diametrically across the housing 14 and of sufficient depth to substantially contain the carrier. The guide slot 31 forms a mounting for the pivotal end of the carrier 30, while the opposite slot 32 forms a catch into which the free end of the carrier is locked.

Near the pivot end of the carrier 30 is a transverse bore 33 through which a ring 35 is passed to rotatably connect the carrier with the housing 14. Extending around the interior rim of the housing 14 is a groove 36, as may best be seen in Figs. 3 and 5. The groove 36 holds the ring 35 which is formed of spring wire or the like, and has a small open sector so that it can be conveniently snapped into place or removed. One side of the ring 35 passes through the bore 33 to provide a hinge means about which the carrier 30 pivots, while the other side forms a detent to lock the carrier into alignment with the housing 14. As is best seen in Fig. 3, the outer ends of the bore 33 are enlarged at 34 to allow clearance for the radius of curvature of the ring 35 which must conform to the groove 36.

The outer or free end of the carrier 30 has a curved undercut portion 37 which extends upwardly to a V notch 38 adapted to receive the ring 35. The notch 38 is of slightly smaller radius than the ring 35, and forms a snap fit so that when the ring 35 has passed into the notch it is held firmly therein. Above the notch 38, the carrier 30 is extended outwardly to form a tapered projection 39 which can easily be grasped by the fingers when it is desired to open the carrier. It should also be noted that although the carrier 30 is positively mounted on the housing 14, it can easily be disengaged for cleaning purposes by removal of the ring 35.

The purpose in having the carrier 30 pivotally removable from the passageway 18 is to facilitate fitting of the socket 10 over the stump 11. Because the socket member 10 must be closely fitted to the stump 11, the wearer experiences difficulty when inserting the stump into the socket of the prosthesis and generally uses a silk stocking or the like to relieve the friction. After the stump 11 is in place, the stocking may be withdrawn through the passageway 18. The carrier 30 is, of course, swung out of the way during this operation. It is not essential that the carrier 30 be positively engaged with the housing 14, but it is highly desirable because of the danger of its being dropped or misplaced during the operation. As can be understood, the simple motion of stooping to the floor is a very difficult one for a man equipped with an artificial leg. The housing 14 is preferably mounted so that the carrier is horizontally disposed and opens outwardly away from the inside of the leg. This is desirable since the stocking is usually pulled outwardly and downwardly.

The operation of the valve is extremely simple. After the stump has been inserted into the prosthesis and the stocking removed as previously described, the carrier 30 is snapped into the closed position. This places the valve disk 22 in adjacent relationship to the valve seat 20. The adjustment screw 25 is then moved axially to compensate for the personal characteristics of the wearer. Normally, the stem 23 is adjusted to a position in which the valve disk 22 is slightly opened or cracked to allow free air passage, but will close instantly with the slightest negative pressure when the leg is suspended, and may open outwardly to provide a port 27 of large area under applied load or pressure. In certain cases the wearer may require a closer valve setting than outlined and the adjustment screw 25 is moved inwardly so that the normal opening of the port 27 is lessened, changing the operating pressure differential of the valve, and the fractional time required for the valve disk 22 to seat from the open position. In other cases a much looser valve setting is required and the adjustment screw 25 may be moved outwardly to the extent that a greater time element may be required for the disk 22 to engage and seal with the seat 20. These conditions are, of course, different with each individual, and adjustments are easily made by means of the wrench socket 26.

When the wearer is in a relaxed position, the valve disk 22, because of its light weight and floating mount, does not close tightly against the seat 20, and circulation of air into the interior of the socket member 10 takes place. However, as the wearer lifts the stump 11 even a slight amount, the valve disk 22 closes instantly and maintains a vacuum in the socket to keep the leg firmly in place. For various activities such as driving an automobile, where the wearer is sitting with the stump 11 in a generally horizontal position, an instantaneous response is secured by placing the housing 14 on the front part of the socket member 10 so that the disk 22 lies in a horizontal position loosely closed on the seat 20. Gravity thus keeps the valve disk 22 closed so that it operates quickly under any movement of the prosthesis.

In the walking cycle when the stump 11 moves downwardly in the socket 10, the valve disk 22 opens to allow the escape of any air being compressed in the pocket between the end of the stump and the socket. The disk 22 remains in this position, admitting a circulation of fresh air into the socket until the leg is lifted from the ground. When the leg is lifted, the disk 22 closes instantly to maintain the vacuum. As may now be fully understood, the valve has an intermittent action alternately exerting a slight vacuum pull and releasing the pressure on the limb stump 11. The result is a stimulating massaging action on the stump 11, which permits a healthier and more normal skin functioning. Also, the previously mentioned objective including the reduction of edema, foul odors, perspiration, and excess heat are achieved.

While we have illustrated a preferred embodiment of our invention which is fully capable of achieving the aforementioned objects and advantages, it is to be understood that various changes and modifications can be made without departing from the scope of our invention, and we do not wish to be limited to the details described herein, except as defined in the appended claims.

We claim:

1. In a limb prosthesis having a socket to receive a stump, and said socket being of such dimensions as to provide an air pocket between the distal end thereof and said stump, a valve to control the pressure within said air pocket comprising: a cylindrical housing having a passageway therethrough with an inner flange forming an outwardly facing valve seat; closure means in said passageway having a valve disk slidably mounted on a central stem and closable against said valve seat, said valve disk being normally open and closable against said valve seat to maintain a reduced pressure within said socket as the limb stump of the wearer is withdrawn; a carrier pivotally mounted on the face of said housing and spanning said passageway for supporting said closure means, said carrier being adapted to swing said closure means into or out of said passageway; and adjustment means connecting said stem and said carrier for adjusting the amount of opening of said valve disk relative to said valve seat.

2. In a limb prosthesis having a socket to receive a stump, and said socket being of such dimensions as to provide an air pocket between the distal end thereof and said stump, a valve to control the pressure within said air pocket comprising: an annular housing having an axial passageway with a peripheral groove in the wall thereof and an inner flange forming an outwardly faced valve seat, the outer rim of said housing having diametrically spaced guide slots formed therein; a resilient ring mounted in said housing groove and extending across said guide slots; an elongated carrier fitted within said guide slots and spanning said passageway, one end of said carrier being pivotally mounted on said ring and the other end of said carrier being recessed to engage in a snap-fit with said ring; and closure means supported by said carrier for movement into or out of said passageway, said means including a floating valve disk normally open and closable against said valve seat to maintain a reduced pressure within said socket.

3. A valve for a suction prosthesis which includes: an annular housing adapted to be mounted in the socket wall of said prosthesis in an opening communicating with the interior of said socket, said housing having an outwardly opening passageway with a peripheral groove in the wall thereof and an inner flange forming an outwardly faced valve seat, the outer rim of said housing having diametrically spaced guide slots formed therein; a circular resilient ring mounted in said housing groove and extending across said guide slots; an elongated carrier fitted within said guide slots and spanning said passageway, one end of said carrier being pivotally journaled on said ring by a transverse bore having enlarged end portions to accommodate the curvature of said ring; and the other end of said carrier being recessed to engage in a snap-fit with said ring, whereby said carrier may be quickly swung into or out of said passageway; a central stem supported by said carrier and having an enlarged inner head and an outer threaded portion engaged in said carrier for adjustment therewith; and a flexible valve disk slidable on said stem and adapted to close against said valve seat when the pressure within said socket is reduced, and to remain normally open forming an annular port, the size of said port being determined by the adjustment of said stem.

4. In a limb prosthesis having a socket to receive a stump, and said socket being of such dimensions as to provide an air pocket between the distal end thereof and said stump, a valve to control the pressure within said air pocket comprising: an annular housing having an outwardly opening passageway with a peripheral groove in the wall thereof and an inner flange forming an outwardly faced valve seat, the outer rim of said housing having diametrically spaced guide slots formed therein; a circular resilient ring mounted in said housing groove and extending across said guide slots; an elongated carrier fitted within said guide slots and spanning said passageway, one end of said carrier being pivotally journaled on said ring by a transverse bore having enlarged end portions to accommodate the curvature of said ring, and the other end of said carrier being recessed to engage in a snap-fit with said ring, whereby said carrier may be quickly swung into or out of said passageway; a central stem supported by said carrier and having an enlarged inner head and an outer threaded portion engaged in said carrier for adjustment therewith; and a flexible valve disk slidable on said stem and adapted to close against said valve seat when the pressure within said socket is reduced, and to remain normally open forming an annular port, the size of said port being determined by the adjustment of said stem.

5. A valve for a section prosthesis which includes: an annular housing adapted to be mounted in the socket wall of said prosthesis in an opening communicating with the interior of said socket by engagement of longitudinal serrations spaced around said housing, said housing having an axial passageway with a peripheral groove in the wall thereof, and an inner flange forming an outwardly faced valve seat, the outer rim of said housing having diametrically spaced guide slots formed therein; a circular spring wire ring mounted in said housing groove and extending across said guide slots; an elongated carrier fitted within said guide slots and spanning said passageway, one end of said carrier being pivotally journaled on said ring by a transverse bore having enlarged end portions to accommodate the curvature of said ring, and the other end of said carrier being recessed to engage in a snap-fit with said ring, whereby said carrier may be quickly swung into or out of said passageway; a central stem supported by said carrier and having an enlarged inner head and an outer threaded portion engaged in said carrier for adjustment therewith; and a valve disk of resilient material loosely mounted on said stem and slidable from said head to said threaded portion, said disk being of a diameter less than said passageway and large enough to close firmly on said valve seat, said disk remaining normally open to form an annular port, the size of said port being determined by the adjustment of said stem.

6. In a limb prosthesis having a socket to receive a stump, and said socket being of such dimensions as to provide an air pocket between the distal end thereof and said stump, a valve to control the pressure within said air pocket comprising: an annular housing having longitudinal serrations spaced around the exterior thereof and diametrically spaced guide slots formed in the outer rim, the interior of said housing defining an axial passageway having a peripheral groove in the wall thereof and an inner flange forming an outwardly facing valve seat; a circular spring wire ring mounted in said housing groove and extending across said guide slots; an elongated carrier fitted within said guide slots and spanning said passageway, one end of said carrier being pivotally journaled on said ring by a transverse bore having enlarged end portions to accommodate the curvature of said ring, and the other end of said carrier being recessed to engage in a snap-fit with said ring, whereby said carrier may be quickly swung into or out of said passageway; a central stem supported by said carrier and having an enlarged inner head and an outer threaded portion engaged in said carrier for adjustment therewith; and a valve disk of resilient material loosely mounted on said stem and slidable from said head to said threaded portion, said disk being of a diameter less than said passageway and large enough to close firmly on said valve seat, said disk remaining normally open to form an annular port, the size of said port being determined by the adjustment of said stem.

7. A valve of the class described which includes: a housing having a passageway therethrough; a floating valve member within said housing; and a carrier pivotally mounted on said housing and supporting said valve member, said carrier swinging free of said housing to provide a full opening through said passageway, and being normally closed to hold said valve member in an operable position.

8. In a valve of the class described: a valve carrier for supporting a valve member, said carrier having a bearing at one end thereof, and a recessed catch at the opposite end; and a snap ring passing through said bearing to hinge said carrier for outward swinging, and adapted to snap lock with said catch at the opening end of said carrier.

JOHN WILLIAM WHITE.
JOHN J. VOLLMER.

REFERENCES CITED

The following references are of record in the file of this patent:

UNITED STATES PATENTS

| Number | Name | Date |
|---|---|---|
| 325,074 | Gordon | Aug. 25, 1885 |
| 388,871 | Hoffman | Sept. 4, 1888 |
| 980,457 | Toles | Jan. 3, 1911 |
| 2,530,285 | Catranis | Nov. 14, 1950 |